(12) United States Patent
Song et al.

(10) Patent No.: US 12,455,824 B2
(45) Date of Patent: Oct. 28, 2025

(54) DRAM CACHE WITH STACKED, HETEROGENOUS TAG AND DATA DIES

(71) Applicant: Rambus Inc., San Jose, CA (US)

(72) Inventors: Taeksang Song, San Jose, CA (US); Michael Raymond Miller, Raleigh, NC (US); Steven C. Woo, Saratoga, CA (US)

(73) Assignee: Rambus Inc., San Jose, CA (US)

( * ) Notice: Subject to any disclaimer, the term of this patent is extended or adjusted under 35 U.S.C. 154(b) by 80 days.

(21) Appl. No.: 18/242,344

(22) Filed: Sep. 5, 2023

(65) Prior Publication Data

US 2024/0086325 A1    Mar. 14, 2024

Related U.S. Application Data

(60) Provisional application No. 63/463,260, filed on May 1, 2023, provisional application No. 63/405,408, filed on Sep. 10, 2022.

(51) Int. Cl.
*G06F 12/08* (2016.01)
*G06F 12/0815* (2016.01)
*G06F 12/123* (2016.01)

(52) U.S. Cl.
CPC ........ *G06F 12/0815* (2013.01); *G06F 12/123* (2013.01); *G06F 2212/305* (2013.01)

(58) Field of Classification Search
CPC ............... G06F 12/0815; G06F 12/123; G06F 12/0893; G06F 2212/305; G06F 2212/608; G06F 2212/604; G06F 2212/1008; G06F 2212/6012; G06F 15/18
See application file for complete search history.

(56) References Cited

U.S. PATENT DOCUMENTS

| | | | |
|---|---|---|---|
| 7,552,255 B1 * | 6/2009 | George ............... | G06F 12/1036 710/52 |
| 9,170,948 B2 | 10/2015 | Oh et al. | |
| 9,558,120 B2 | 1/2017 | Rolan et al. | |
| 10,180,906 B2 | 1/2019 | Stocksdale et al. | |
| 2012/0221785 A1 * | 8/2012 | Chung ............... | G06F 12/0893 711/E12.078 |

(Continued)

OTHER PUBLICATIONS

Jevdjic, Djordje et al., "Unison Cache: A Scalable and Effective Die-Stacked DRAM Cache", 2014 47th Annual IEEE/ACM International Symposium on Microarchitecture, 2014, pp. 25-37. 13 pages.

(Continued)

*Primary Examiner* — Tracy C Chan
(74) *Attorney, Agent, or Firm* — Charles Shemwell

(57) ABSTRACT

A high-capacity cache memory is implemented by multiple heterogenous DRAM dies, including a dedicated tag-storage DRAM die architected for low-latency tag-address retrieval and thus rapid hit/miss determination, and one or more capacity-optimized cache-line DRAM dies that render a net cache-line storage capacity orders of magnitude beyond that of state-of-the art SRAM cache implementations. The tag-storage die serves double-duty in some implementations, yielding rapid tag hit/miss determination for cache-line read/write requests while also serving as a high-capacity snoop-filter in a memory-sharing multiprocessor environment.

17 Claims, 7 Drawing Sheets

(56) References Cited

U.S. PATENT DOCUMENTS

| | | | |
|---|---|---|---|
| 2013/0042078 A1* | 2/2013 | Jalal | G06F 12/0815 |
| | | | 711/146 |
| 2013/0046934 A1 | 2/2013 | Nychka et al. | |
| 2014/0146589 A1 | 5/2014 | Park et al. | |
| 2014/0181384 A1* | 6/2014 | Loh | G06F 12/0846 |
| | | | 711/104 |
| 2014/0181417 A1 | 6/2014 | Loh et al. | |
| 2014/0237185 A1* | 8/2014 | Solihin | G06F 12/1027 |
| | | | 711/119 |
| 2019/0189210 A1* | 6/2019 | Farmahini Farahani | |
| | | | G11C 5/04 |
| 2019/0196974 A1 | 6/2019 | Kalyanasundharam et al. | |

OTHER PUBLICATIONS

Meswani, Mitesh R et al., "Heterogeneous Memory Architectures: A HW/SW Approach for Mixing Die-Stacked and Off-Package Memories", 2015 IEEE, pp. 126-136. 11 pages.

\* cited by examiner

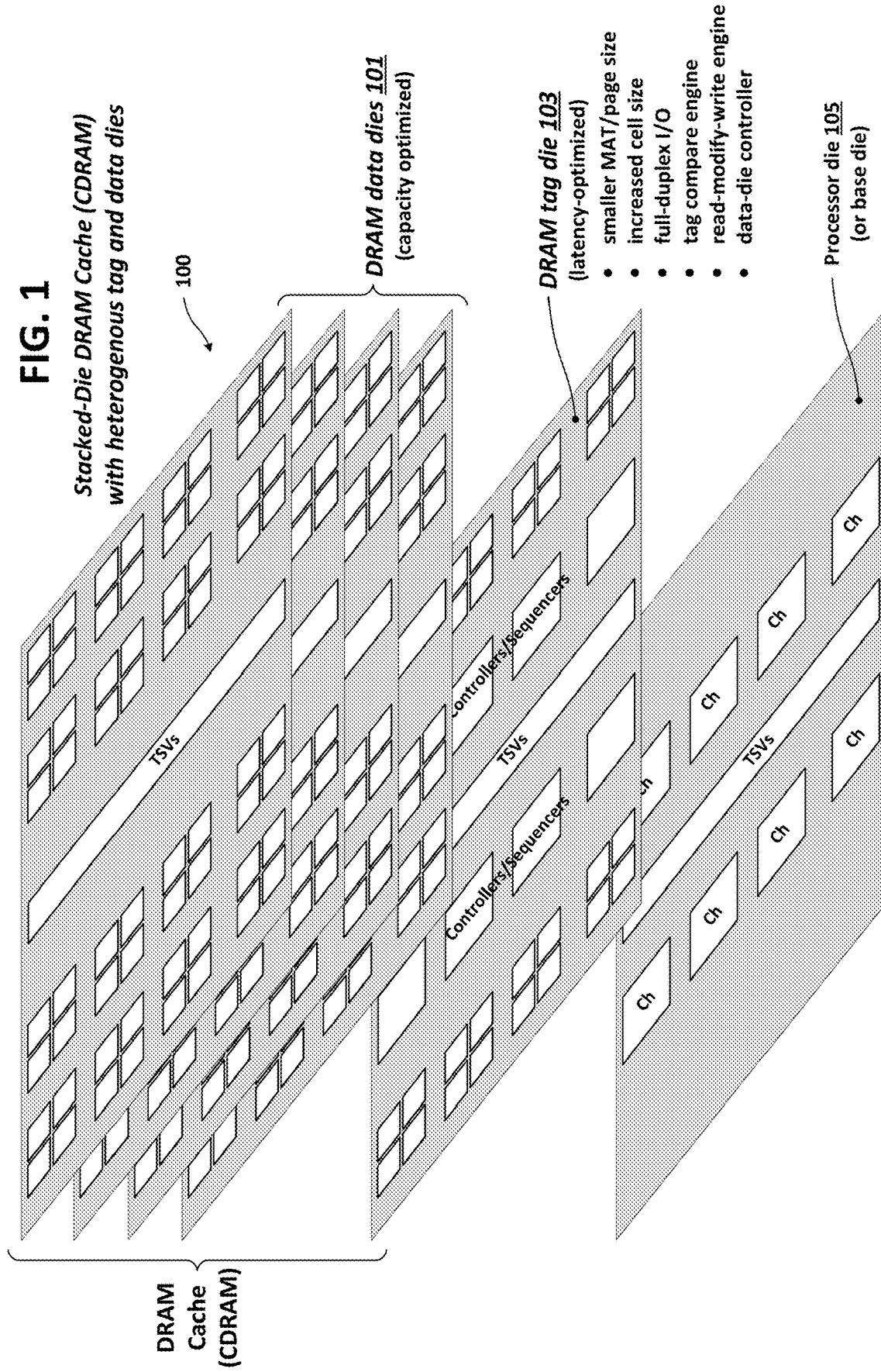

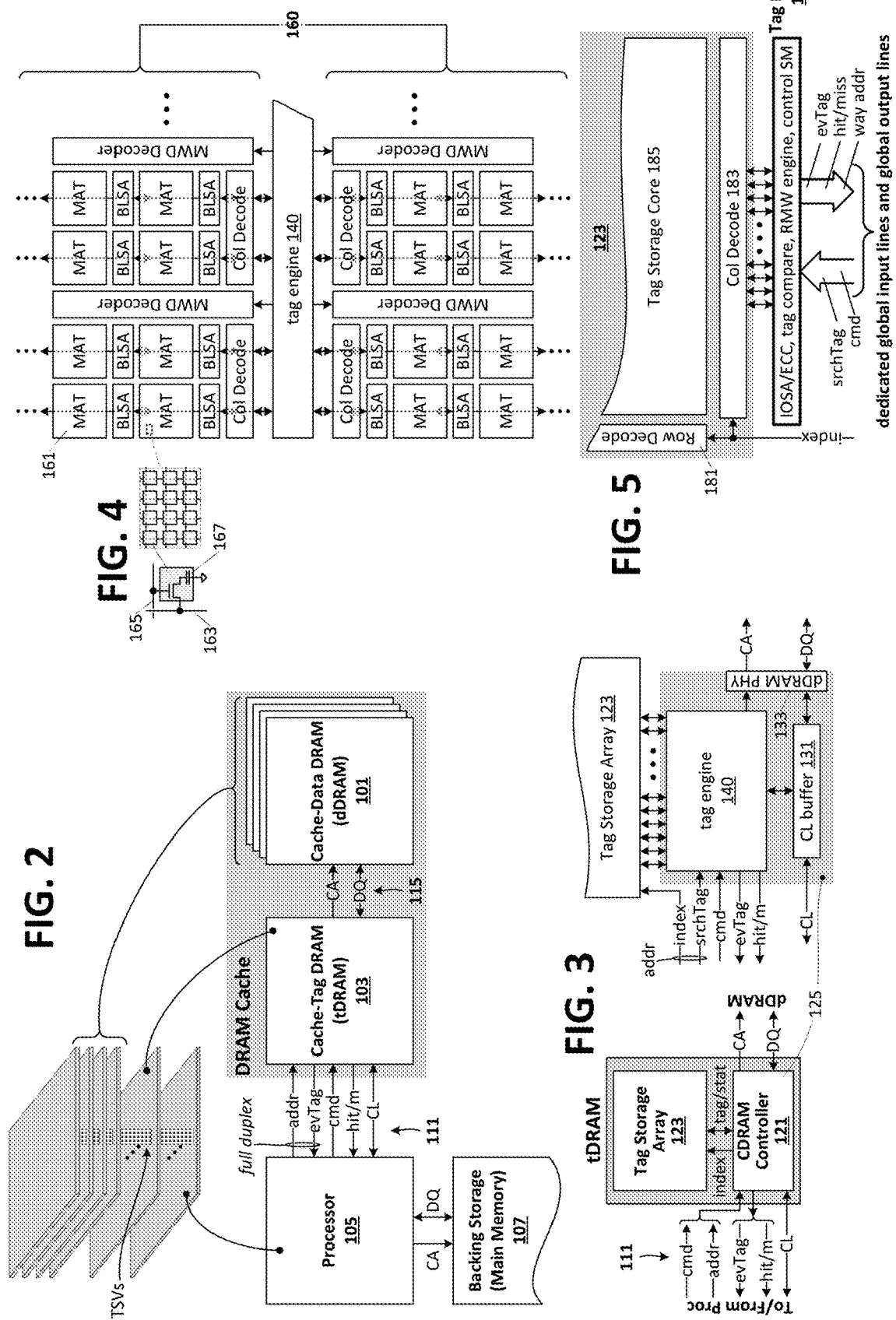

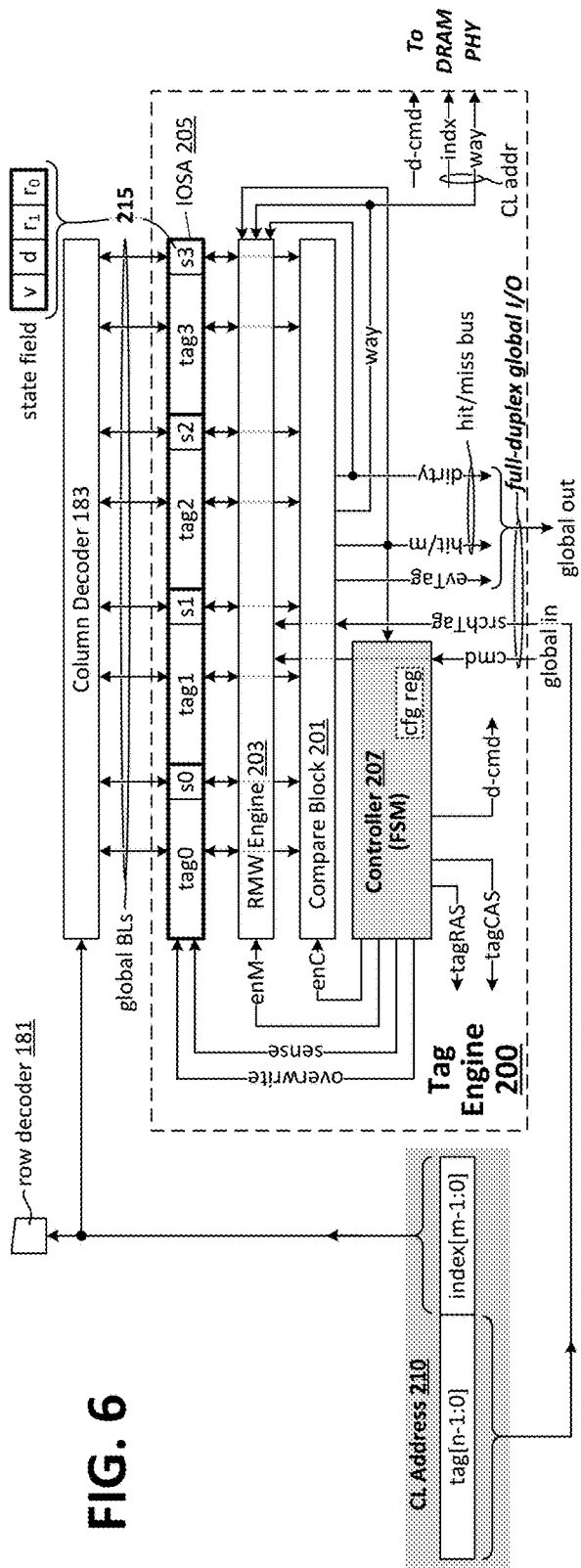
FIG. 6
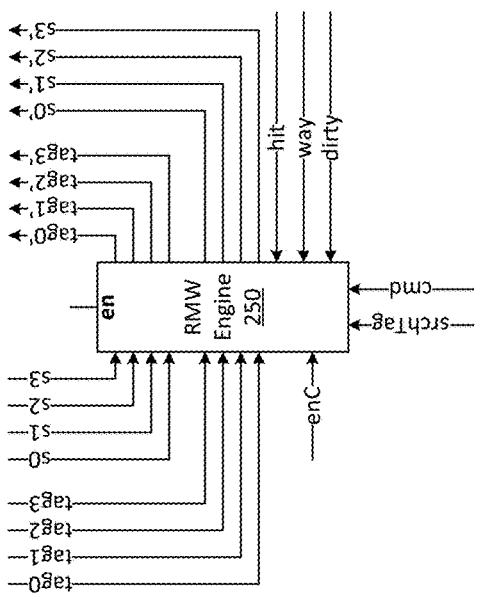
FIG. 8  RMW Engine
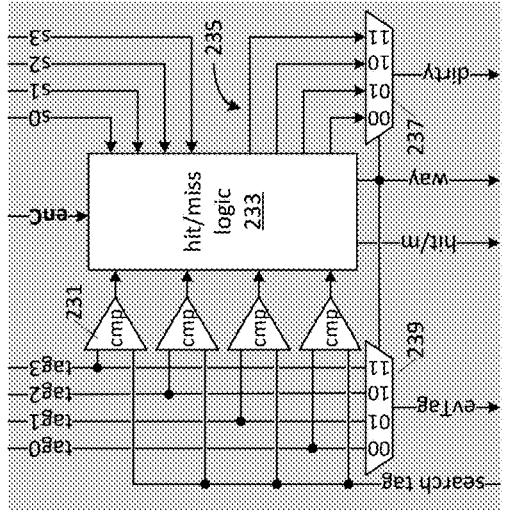
FIG. 7  Compare Block 230

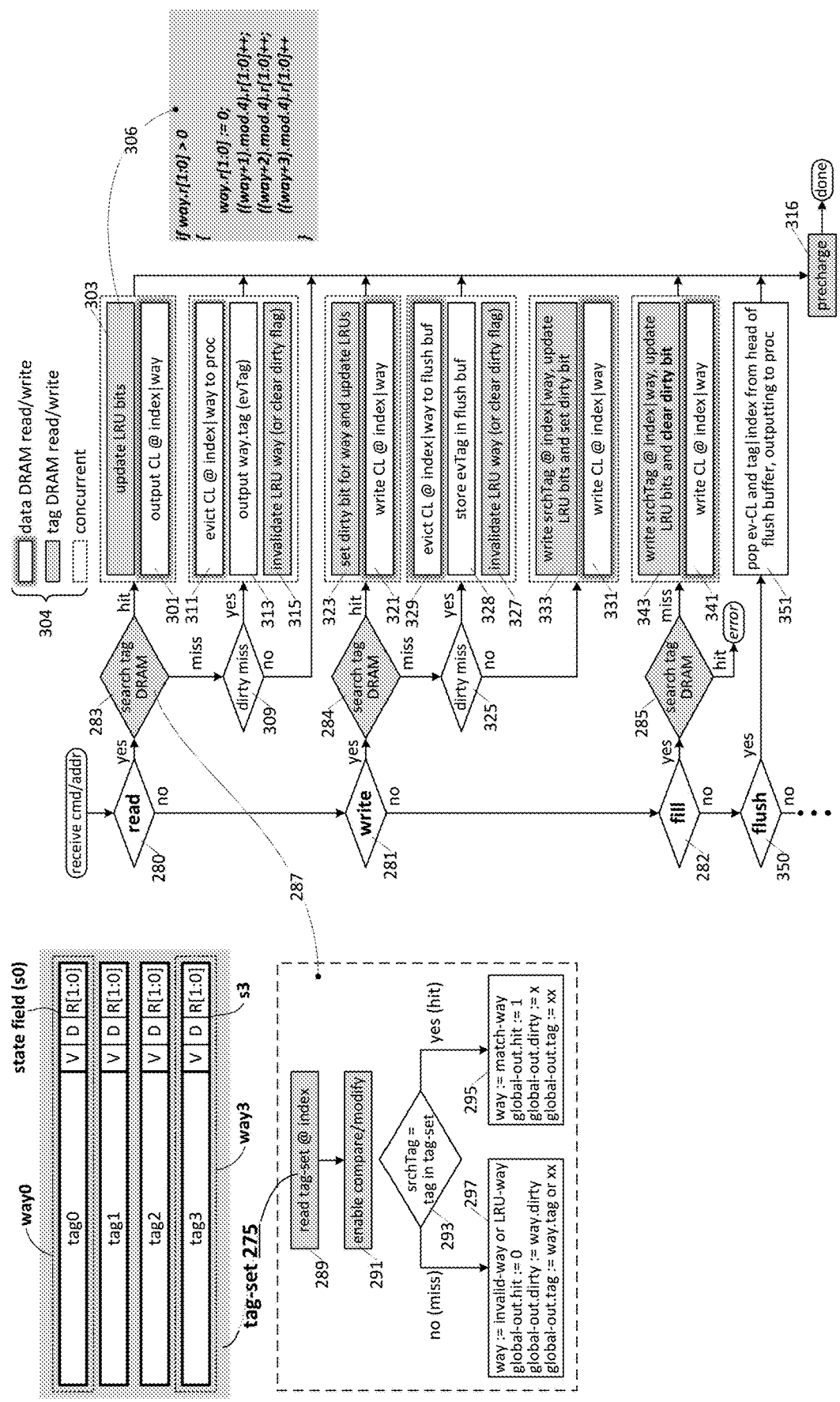
FIG. 9 Multiple ways stored in diverse data DRAM rows

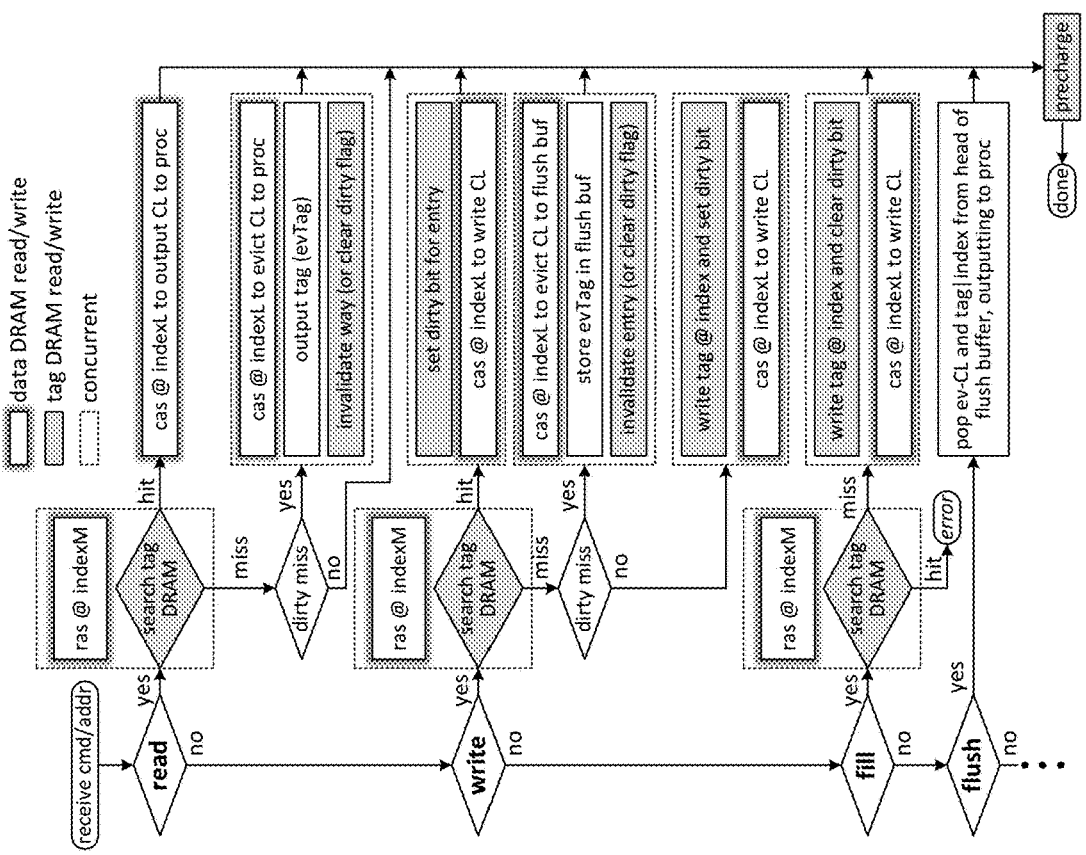
FIG. 10 Multiple ways co-located in data DRAM row (early RAS)
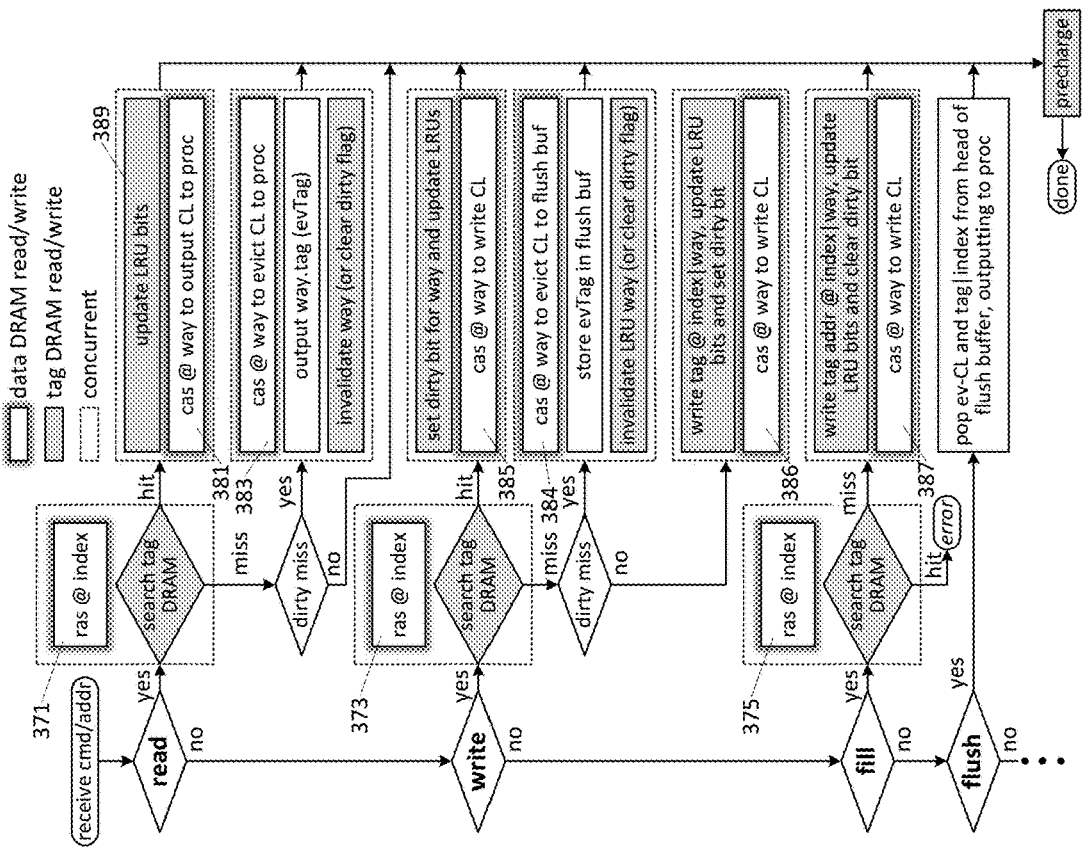
FIG. 11 Direct-Mapped (single way)

DRAM CACHE WITH STACKED, HETEROGENOUS TAG AND DATA DIES

CROSS-REFERENCE TO RELATED APPLICATIONS

This application hereby incorporates by reference and claims the filing-date benefit of U.S. Provisional Application No. 63/405,408 filed Sep. 10, 2022 and U.S. Provisional Application No. 63/463,260 filed May 1, 2023.

TECHNICAL FIELD

The disclosure herein relates to integrated-circuit data storage and more specifically to dynamic random access memory (DRAM) cache architecture and operation.

DRAWINGS

The various embodiments disclosed herein are illustrated by way of example, and not by way of limitation, in the figures of the accompanying drawings and in which like reference numerals refer to similar elements and in which:

FIG. 1 illustrates an embodiment of a DRAM cache (CDRAM) having multiple data DRAM dies and a dedicated tag DRAM die;

FIG. 2 illustrates the stacked-die arrangement shown in FIG. 1 together with a system level diagram showing exemplary interconnections between constituent dies within the die stack and between the processor and a backing-store memory;

FIG. 3 illustrates a more detailed embodiment of a tag DRAM die that may implement the tag DRAM dies shown in FIGS. 1 and 2;

FIG. 4 illustrates a yet more detailed embodiment of a low-latency tag DRAM (i.e., as may be deployed in the embodiments of FIGS. 1-3) having a tag engine embedded within a multiple-mat tag storage array;

FIG. 5 illustrates an embodiment of a tag engine that may implement the embedded tag engine shown in FIG. 4;

FIG. 6 illustrates a more detailed tag engine embodiment showing compare block, read-modify-write engine, input/output sense amplifiers and controller components thereof;

FIG. 7 illustrates an embodiment of a compare logic circuit that may be deployed within a 4-way set-associative implementation of the FIG. 6 tag engine;

FIG. 8 illustrates an embodiment of a four-way read-modify-write engine that may implement the RMW engine shown within the FIG. 6 tag engine;

FIG. 9 illustrates exemplary operations implemented by the FIG. 6 tag engine in response to incoming cache access commands;

FIGS. 10 and 11 illustrate exemplary tag-engine operations in CDRAM embodiments for which all shared-index cache lines may be simultaneously activated within the data DRAMs;

DETAILED DESCRIPTION

Figure 13:
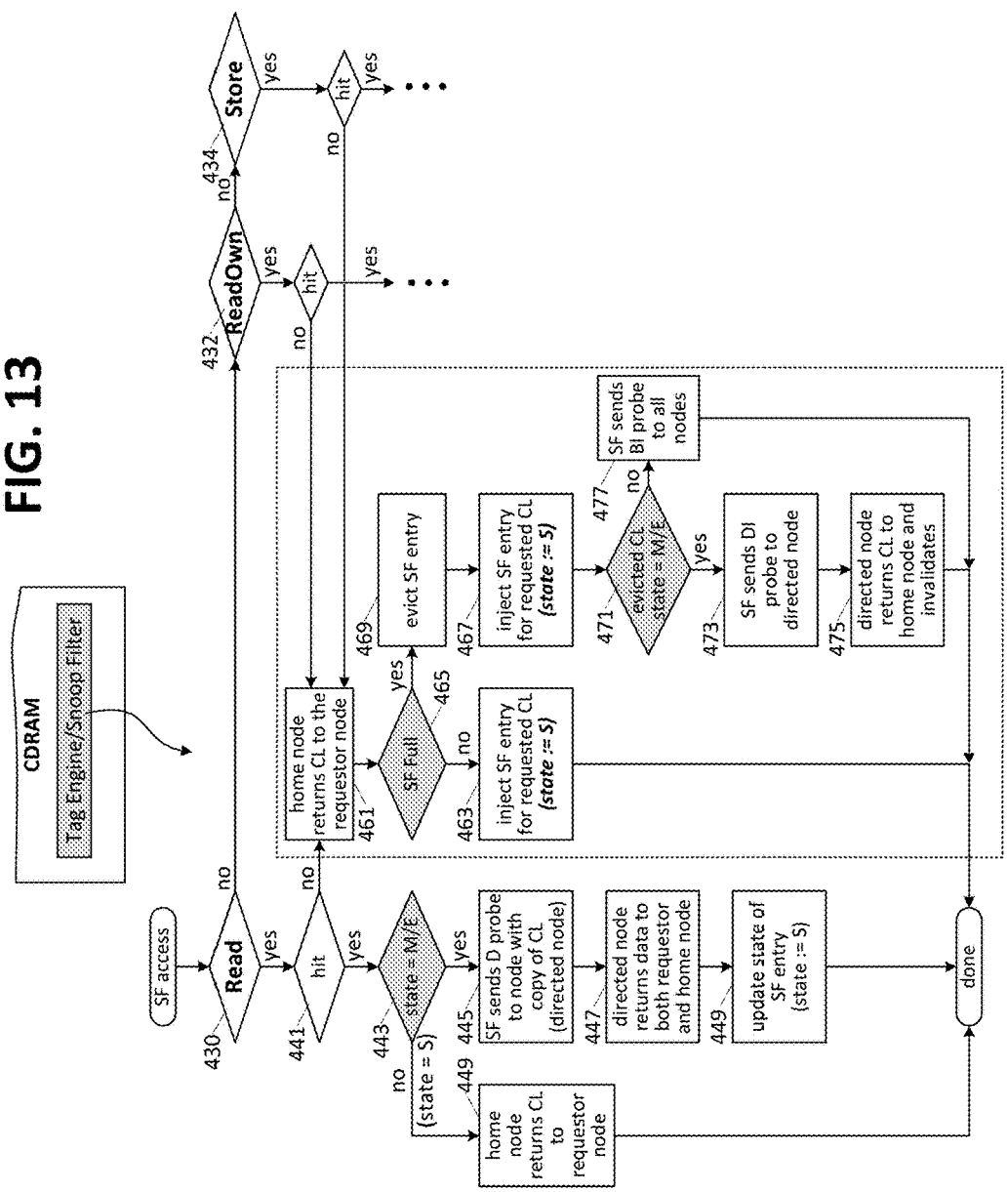
FIG. 13 illustrates an exemplary sequence of operations executed within the CDRAM-resident tag-engine/snoop filter within the computing system of FIG. 12.

In various embodiments herein, a high-capacity cache memory is implemented by multiple heterogenous DRAM dies, including one or more dedicated tag-storage DRAM dies architected for low-latency tag-address retrieval and thus rapid hit/miss determination, and one or more capacity-optimized cache-line DRAM dies that render a net cache-line storage capacity orders of magnitude beyond that of state-of-the art SRAM cache implementations. In several embodiments, the tag-storage die serves double-duty, implementing rapid tag hit/miss determination both for cache-block retrieval purposes (i.e., retrieving/writing cache lines from/to the cache-block DRAMs) and for snoop-filter operation in a data-sharing multiprocessor environment. In those and other embodiments, the tag die may include full-duplex data input/output (IO) signaling paths (and corresponding full-duplex internal IO lines—global IO lines) to enable victim tag fields (i.e., tags corresponding to cache lines slated for eviction) to be output concurrently with incoming search tags (i.e., the latter accompanying a cache line read/write request), thus avoiding data bus turnaround penalty incurred within conventional DRAM architectures and increasing cache bandwidth (rate at which cache-line read/write requests may be issued to the cache). Additionally, in a number of implementations, the tag die includes an embedded DRAM command sequencer/controller to issue cache-line read/write instructions to the cache-line DRAMs (the "data" DRAMs) and thus speed overall cache operation by (i) avoiding the overhead of coordinating such cache line accesses with a host processor, and (ii) commence data DRAM access immediately upon internal hit/miss determination. In yet other embodiments, the tag DRAM die includes, together with a cache compare block, a read-write modify engine that writes status data and updated tag addresses back into a page-buffered tag entry (i.e., into a set of tags in a multi-way set-associative architecture, or into in a single tag entry in a direct-mapped architecture) prior to tag DRAM precharge, thus avoiding multiple row activation operations per tag search operation and enabling precharge (and thus readiness for a subsequent row activation with respect to an incoming cache read/write address) with minimal delay. These and other embodiments are described in greater detail below.

FIG. 1 illustrates an embodiment of a cache memory 100 having multiple data DRAM dies 101 and a dedicated tag DRAM die 103—an architecture that leverages insights regarding characteristic differences between the tag search and cache line read/write functions, including relative tag and data storage requirements (on the order of 1:20), access frequency (~2:1 as tag memory is accessed in response to most incoming commands at least once and often twice), bus turnaround events (~2:1 as every miss with respect to an incoming tag is accompanied, at least in some embodiments, by an outgoing tag corresponding to a victim cache line) and access latency impact (more severe for tag memory as the latency penalty is incurred for both hits and misses, while only for hits within the cache-line storage). Recognizing that the address tags require substantially less storage than corresponding cache lines (e.g., can be ~3 bytes for tag and related state data vs 64B or more for the corresponding cache line when caching a 50b address space) and yet is more frequently accessed, capacity is sacrificed within a dedicated tag DRAM die in favor of reduced readout latency (in contrast to conventional efforts to maximize storage density), for example, by reducing the cell-array mat size (and page size) and thus reducing wordline/bitline loading and capacitance to yield substantially lowered row-cycle time (tRC)—in some cases shrinking row-cycle time by a factor of 5 or more (e.g., typical 40-60 nanosecond row-cycle time reduced to less than 10 nanoseconds). DRAM cell size is additionally (or alternatively) enlarged in some embodiments, to yield higher bitline drive strength and achieve similarly reduced (or further reduced) row activation latency. In those and other embodiments, bus turn-around latency is eliminated (or at least substantially reduced) within the tag die by providing separate primary input and output paths (i.e., full duplex IO) both at the signaling interface with a die-stack-integrated processor die (or base die) and within the global IO lines that convey incoming and outgoing tag addresses to the internal tag-control engine. Moreover, the tag engine itself includes an embedded tag compare block, read-modify-write (RMW) engine and data DRAM controller to enable in-situ hit/miss determination (avoiding the latency otherwise incurred to output stored tags from the tag-die core to external circuitry), on-the-fly tag entry update (e.g., writing-back least-recently-used or other eviction-management information and/or coherency information (i.e., entry clean/dirty, valid/invalid)) within the activated memory page (i.e., within the page buffer to which the indexed tag DRAM entry was conveyed during row activation) and thus correspondingly rapid DRAM array precharge (closing the open page) to make ready for subsequent row activation.

In the FIG. 1 example, tag DRAM die 103 and one or more data DRAM dies 101 are stacked in a three-dimensional stacked-die structure (multi-die integrated circuit component referred to herein as a cache DRAM or CDRAM) together with a processor die 105. In a number of embodiments, the stacked dies (processor, tag DRAM die and data DRAM dies) are electrically connected/coupled to one another by through-silicon vias (TSVs), though various alternative/additional interconnect structures may be used (e.g., interposers, wire bonds, etc.). The stacked die structure is scalable in the sense of supporting a variable number of data DRAM dies per CDRAM and also enabling complete DRAM cache instances to be stacked on one another (i.e., two or more CDRAMs implemented within a single die stack). Also, while generally presented as part of the die stack in embodiments discussed below, the processor die may be omitted from the die stack in favor of a base layer die that bridges between the tag die and an external processor. Further, instead of a stacked-die structure, one or more or all component dies shown in FIG. 1 (or shown/described in any other embodiments presented herein) may be disposed laterally (side-by-side) with respect to one or more other dies in a multi-die integrated circuit package.

FIG. 2 illustrates the stacked-die arrangement shown in FIG. 1 together with a system level diagram showing exemplary interconnections between constituent dies within the die stack (processor 105, tag DRAM 103, one or more data DRAMs 101) and between the processor and a system memory referred to herein as a backing store 107. In general, the backing store constitutes a relatively long-latency main/primary memory within the compute system to be accessed only after a miss within the cache hierarchy (the processor may have any number of on-die caches—e.g., L1, L2, L3 cache, with the off-die DRAM cache—collectively implemented by dies 103/105—serving as a last-level cache in at least some instances). Accordingly, the backing store constitutes a destination for cache lines evicted from the DRAM cache ("CDRAM") and a source of cache lines loaded into the CDRAM.

In the FIG. 2 example, tag DRAM die 103 is interposed between processor 105 and data DRAM dies 101, communicating with the processor via cache interface 111 and controlling operations within the data DRAMs via a DRAM-control interface 115 (i.e., transmitting command/address values (CA) to data DRAMs 101 as necessary to read and write cache lines therein). In a number of embodiments, tag DRAM die 103 includes multiple physical signaling interfaces (PHYs) each coupled point-to-point with a respective data DRAM die 101 to enable concurrent, independent command and/or data transfer (at least partly overlapping in time) with respect to the data DRAM dies. In alternative embodiments, any two or more or all of the data DRAM dies may be coupled to a shared set of command/address and/or DQ links, with chip-selects and/or logical chip identifiers provided to enable a specific DRAM die (or set of DRAM dies) to respond to a given memory access command.

Still referring to FIG. 2, processor 105 separately communicates with backing store 107, for example, via one or more memory control interfaces similar to the interface(s) between the tag DRAM and data DRAMs, though any memory-semantic interface capable of conveying command/address values (CA) and receiving/transmitting read and write data (e.g., CXL, Gen-Z, OpenCAPI, etc. operating over a peripheral component interconnect express (PCIe) or any other practicable physical layer) may be implemented in alternative embodiments. Also, as discussed below in the context of snoop-filter operation, two or more processors may share their respective memory installations—each processor having a directly-connected memory that may be accessed upon request from the other processor(s). Referring to FIGS. 2 and 3, the cache control/response interface 111 between the processor and DRAM cache (CDRAM) includes command and address input lines (i.e., to convey cache commands—and optionally snoop filter commands as discussed below—and corresponding address values), a set of data lines ("CL") to convey inbound and outbound cache lines (e.g., bidirectional DQ bus or full-duplex DQ bus with separate data input and output lines), and cache-response lines that include a hit/miss bus and victim tag address lines (i.e., tag address of a cache line subject to eviction, "evTag"). In the FIG. 3 tag DRAM embodiment, a CDRAM controller 121 reads and writes tag entries within a tag storage array 123 in response to incoming command/address values—for example, applying an index sub-field of an incoming address to read out one or more tag values (and corresponding status bits) for comparison with a tag sub-field of the incoming address and, by virtue of that comparison, resolving a cache hit or miss (i.e., tag storage array does or not contain a valid, matching instance of the processor-supplied "search" tag) and signaling the hit/miss result on a hit/miss bus ("hit/m"). In the case of a cache read command yielding a hit, the CDRAM issues a read command together with the processor-supplied index (supplementing the index with one or more bits indicating which of multiple tag ways yielded the match in a multi-way set-associative CDRAM implementation) to the data DRAM(s) to retrieve the requested cache line, returning the cache line to the host processor (i.e., via CL bus). Conversely, in the case of a cache write hit (i.e., cache write command yielding a hit within the tag DRAM), CDRAM controller 121 issues a write command to the data DRAM(s) to write a processor-supplied cache line to the data DRAMs at the processor-supplied address.

Referring to an embodiment shown in detail view 125 (FIG. 3), CDRAM controller 121 includes a cache line buffer 131, data DRAM PHY 133 and tag engine 140, with the latter responding to processor-supplied cache commands and addresses (including index and search-tag sub-fields as shown) by issuing control signals to other controller components (131, 133) and tag storage array 123 as necessary to assess cache hit/miss (driving hit/miss bus accordingly) and manage cache line read and write, including cache line evictions for which an eviction tag ("evTag) is output via full-duplex interface 111 ((i.e., eviction tag may be output concurrently with reception of index/search tag for a subsequent cache read/write request). In a number of embodiments, discussed in detail below, evicted cache lines may be buffered within cache line buffer 131 (e.g., within a "flush buffer" component of buffer 131) to avoid contention with inbound cache lines (i.e., the latter arriving in connection with a cache write request) and/or enable the host processor to manage the eviction timeline—e.g., retrieving the evicted cache line from the flush buffer in accordance with processor and/or backing store availability.

FIG. 4 illustrates a more detailed embodiment of a low-latency tag DRAM (i.e., as may be deployed in the embodiments of FIGS. 1-3) having the aforementioned tag engine 140 embedded within a multiple-mat tag storage array 160. As in embodiments discussed above, the tag storage array is specially architected to achieve high-speed (low-latency) row activation and column access operations. In the depicted example, for instance, the tag storage array is constituted by relatively small mats 161 (e.g., 50%, 25%, 10% of the data DRAM mat size) and thus relatively short (and therefore reduced capacitance and time-of-flight) bit lines 163 between the mats and block-level sense amplifiers (BLSAs) and correspondingly short/low-capacitance mat word lines 165 (asserted by mat word line decoders "MWD Decoder" to switchably couple an intra-mat row of DRAM cells 167 to block-level bit lines. The block sense amplifiers (which may constitute an address-selectable set of page buffers in some embodiments) and column decoders ("Col Decode") shrink with the reduced mat sizes and thus provide for more rapid data sensing (reducing row activation time) and column access operations than in conventional capacity-optimized DRAM architectures—all such latency-reducing characteristics reducing the row cycle time in some embodiments to fewer than 20 nanoseconds (nS), or fewer than 10 nS, 8 nS or less, and reducing column access operations to a nanosecond or less—in some implementations yielding a tag DRAM row cycle time less than 50% (or 25%, 10%, 5%, 1% or yet smaller percentage) of the data DRAM tRC. As discussed above, individual DRAM cells (167) may also (or alternatively) be enlarged relative to sizing achievable in a given fabrication process, increasing per-cell output drive strength so as to more rapidly charge or discharge attached bit lines (i.e., enabling more rapid sensing of stored logic state) and thereby further reduce (or constitute a primary manner of reducing) row activation latency.

FIG. 5 illustrates an embodiment of an embedded tag engine 140 showing its conceptual disposition between tag storage array 123 and full-duplex global I/O lines, the latter including a dedicated set of global input lines to convey commands/search-tags, and a dedicated set of global output lines to implement the hit-miss bus and convey victim tag address values (evTag) and, in the case of a multi-way set associative cache implementation, way address bits (i.e., "way addr" to be applied within the data DRAM(s) as part of the cache line read/write address). As shown, the index sub-field of the address arriving in association with an incoming cache command is supplied to row decode circuitry 181 (e.g., including the mat word line drivers shown in FIG. 4) and optionally to column decoder 183 (i.e., depending on page size of the activated row and more specifically whether the activated row contains more than one complete set of tags (note that column decoder may be omitted where the activated row size corresponds to the bit width of a single tag set). In the FIG. 5 embodiment, tag engine 140 includes a bank of IO sense amplifiers (IOSA), error code correction (ECC) circuitry (i.e., to detect and, where possible, correct bit errors within an activated row of tag information using ECC bits stored with that row), tag compare circuitry, read/modify-write engine and a control state machine, the latter issuing control signals the other tag engine components, tag storage array and data DRAM PHY as necessary to execute incoming cache commands.

FIG. 6 illustrates a more detailed tag engine embodiment 200 (i.e., that may implement any aforementioned tag engines) showing the compare block (201), RMW engine (203), IO sense amplifiers (205) and controller components discussed above, the latter (207) implemented in this example by a finite state machine. As shown, index and tag components of an incoming cache-line address 210 (i.e., processor-supplied address associated with a read, write or fill command arriving via command lines "cmd" as discussed in greater detail below) are supplied to row/column decoders (181, 183) within the tag array and to the tag input of the tag engine, respectively, the latter constituting the aforementioned search tag. For commands that require tag array read and/or write, controller 207 issues row-address-strobe and column-address-strobe signals to the tag array (tagRAS, tagCAS) to effect, respectively, row decode/activation (delivering contents of an index-specified storage-cell row to column decoder 183) and column decode operations (multiplexing a set of tags within the activated row to I/O sense amplifiers 205 via column decoder 183). The controller likewise issues control signals to the IO sense amplifiers as necessary to sense (and latch) the set of tags output via the column decoder during tag array readout—the set of tags or "tag set" including number 'n' of tag values (tag0, tag1, . . . ) and corresponding state fields (215), where n=1 for a direct mapped CDRAM implementation and n is greater than one for a multi-way set associative implementation (i.e., 'n' specifies the number of tags or "matching ways" stored within the tag DRAM in association with a given index). Through this operation, the IO sense amplifier bank implements a page buffer to store, as an open page, all tags and corresponding state values associated with the processor supplied cache index—the aforementioned tag set.

After latching an index-specified tag set within IO sense amplifier bank 205, controller 207 enables compare block 201 (e.g., asserting "enC") to compare the incoming search tag with valid tag values within the IO sense amplifier bank (validity being signaled by a valid bit within the state field associated with each stored tag) and signal a resulting cache hit/miss result on the hit/miss bus ("hit/m"). In the case of a cache hit within a multi-way tag set, controller 207 issues a command ("d-cmd") to the data DRAM PHY (e.g., as shown at 133 in FIG. 3) to read out the cache line specified by the index and matching-way address bits (i.e., collectively forming a cache line address within the data DRAM (s)), concurrently with a tag DRAM update. To effect the latter (tag DRAM update), controller 207 asserts a modify-enable signal ("enM") to enable read-modify-write engine 203 ("RMW" engine) to generate an updated tag set (i.e., updated state field bits and/or tag field corresponding to way address) and then asserts "overwrite" signal to enable storage of the updated tag set within IO sense amplifier bank 205 (i.e., overwriting contents within IO sense amplifier bank 205 with the updated state-field information/tag address from RMW engine 203), and then lowering tagCAS/tagRAS and/or asserting/deasserting other control signals as necessary to effect a precharge operation within the tag storage array, thus making ready for a subsequent row activation (tag-set retrieval) within the tag storage array.

In the case of a cache-miss (signaled on hit/miss bus, for example, by deassertion of the hit signal when no valid tag within the tag-set matches the search tag), compare block 201 conditionally outputs a dirty flag and victim tag address (i.e., tag address associated with an eviction-candidate cache line within the data DRAM(s)), the dirty flag indicating, in accordance with state-field information, whether the eviction-candidate cache line ("victim CL") does or does not match (or may not match) the corresponding backing-store cache line (i.e., whether the victim CL is or is not coherent with respect to the CL within the backing store) and the eviction tag constituting, together with the processor-supplied index, all or part of an address at which the victim cache line is to be stored within the backing store. Where a cache line is to be evicted from the CDRAM, controller 207 commands the data DRAMs (via "d-cmd" lines) as necessary to read out the victim cache line, in some embodiments storing that cache line in the aforementioned flush buffer for eventual output in response to a "flush" instruction from the processor. In the case of an incoming "fill" command—an instruction from the processor to load a cache line into an unoccupied/vacated location within the data DRAM—controller 206 issues control signals as necessary to load the indexed tag-set into the I/O sense amplifier bank and then enables RMW engine to update a selected way within the tag set with the incoming search tag and state field information (e.g., setting or clearing the dirty bit in accordance with information conveyed with the fill command, updating information indicative of access recency, etc.).

FIG. 7 illustrates an embodiment of a compare logic circuit ("compare block") 230 that may be deployed within a 4-way set-associative implementation of the FIG. 6 tag engine. In the example shown, compare block 230 receives a four-way set of tags and associated state fields from the IO sense amplifier bank and also the search tag associated within an incoming cache command. As in the FIG. 6 embodiment, each of the state fields (s0, s1, s2, s3) includes a valid bit to indicate whether the corresponding tag is valid (a cleared valid bit indicating that the way is unoccupied within both the tag DRAM and data DRAM so that the tag-set and cache-line set may be loaded with a new tag and cache line, respectively, without evicting an extant valid tag/cache-line), a dirty bit to indicate whether the cache line associated with the stored tag may lack coherency with a corresponding cache line within the backing store (a cleared dirty bit conversely indicating a clean cache line that, absent failure/error, matches the cache line within the backing store), and a pair of recency bits (r1, r0—also referred to herein as r[1:0]) that indicate which of the four ways has been least recently used (LRU) and thus support an LRU cache replacement policy (i.e., if eviction required, generally evicting the cache line within the least recently used way). Though LRU replacement policy is presumed with respect to the FIG. 7 embodiment and embodiments discussed below, in all cases alternative and/or supplemental replacement policies may be applied, for example, according to one of multiple replacement policies that may be run-time or production-time selected/enabled through programming of a configuration register as shown by "cfg reg" in FIG. 6 (programmably selectable replacement policies including, for example and without limitation, time-aware LRU, pseudo-LRU, least frequently used, most recently used, re-reference interval prediction, etc.).

When enabled ("enC"), comparators 231 within compare block 230 output match signals to hit/miss logic circuitry 233 according to whether the search tag matches a respective one of the stored tags, with hit/miss logic 233 responsively asserting a hit signal on hit/miss bus ("hit/m") upon detecting a valid match (i.e., match signal asserted with respect to a stored tag indicated to be valid by corresponding state field) and outputting a "way" value that indicates the matching way (e.g., two bit value encoding one of four matching ways). Where there is no valid match (i.e., no match signal assertion for which corresponding state field indicates valid entry), hit/miss block deasserts the hit signal to indicate the cache-miss (or affirmatively asserts a miss signal on the hit/miss bus) and outputs a way value corresponding to an "available" way that may be subsequently filled with a new cache entry—for example, an invalid/unoccupied way or, if all ways are occupied/valid, the least-recently-used way. In the FIG. 7 embodiment, hit/miss block 233 also outputs a set of dirty signals 235 corresponding to respective ways, asserting the dirty signal for a given way if both the dirty and valid bits are set within the corresponding state field, and deasserting the dirty signal if either of those bits are clear (i.e., way signaled to be "clean" if either invalid/unoccupied or having no set dirty bit). As shown, the way value is applied to multiplexer 237 to forward the dirty signal for the specified way to the compare block output and to multiplexer 239 to select the stored tag value for the available way. By this operation, if a dirty miss occurs (e.g., cache miss in which all ways are valid and dirty bit is set for LRU way), multiplexer 239 outputs the tag field (evTag) corresponding to the victim cache line (i.e., cache line to be evicted from the data DRAM) and multiplexer 237 outputs a dirty indication for victim cache line, thus signaling to the tag engine and processor that a cache line is to be evicted from the CDRAM and written to the backing store. Conversely, if a clean miss occurs (e.g., cache miss in which one or more ways are invalid/unoccupied or for which the dirty bit is clear for the LRU way), the clean state of the dirty signal output from multiplexer 237 together with the way value from hit/miss block 233 effectively signal that a cache line may be written to an available way without eviction.

FIG. 8 illustrates an embodiment of a four-way read-modify-write engine that may implement the RMW engine shown at 203 within the FIG. 6 tag engine. In the depicted example, RMW engine 250 receives the tag values and corresponding state fields for the four ways buffered within the IO sense amplifier and, when enabled ("enC"), generates selectively modified instances of those values in accordance with the incoming command, search tag, and compare block results (hit/miss, way, and dirty/clean status). As an example, in response to a hit with respect to a read or write command, RMW engine selectively updates the state-field recency bits for all four ways, outputting those bits in modified instances of the state values (i.e., s0', s1', s2', s3' selectively modified relative to original values s0, sa, s2, s3). RMW engine similarly generates updated state-field recency bits in response to an instruction to populate an available way with a new entry—i.e., a "fill" instruction (discussed in greater detail below)—and also updates the tag value for the associated way, replacing the pre-existing tag value (if any) with a tag value supplied with the fill instruction. The RMW engine likewise replaces the LRU-way tag with the search tag in response to a clean write-cache miss (write command yielding a cache miss with dirty bit clear at LRU way) and may do the same in the case of a dirty miss (on understanding that the dirty miss will evoke a fill instruction from the processor and thus supply the replacement cache line). All such read-modify-write actions, including others discussed below, may be carried out with respect to tag DRAM memory page opened in response to an incoming read, write or fill command, thus effecting two high-speed page access operations per row activation (i.e., reading the tag set from the open page to assess hit/miss and/or ascertain way to be filled, and then writing modified state and/or tag values back into the open page). Moreover, because tag DRAM updates are generally deterministic with respect to the tag set contents, search tag and/or cache command, the tag set within the IO sense amplifier bank may be updated without awaiting completed operations elsewhere within the CDRAM, and the tag DRAM may be precharged following tag set updates without awaiting completed operations within the data DRAMs, and thus promptly readying the tag DRAM for subsequent tag set lookup.

FIG. 9 illustrates exemplary operations implemented by the FIG. 6 tag engine in response to incoming read, write, fill and flush commands. For purposes of example, a four-way set-associative DRAM cache is presented in which (i) each tag set (i.e., four tags and corresponding state fields having valid, dirty, and recency bits as discussed above and shown at 275) is transferred to the IO sense amplifier bank in response to a single row activation operation (i.e., a solitary row activation within the tag storage array loads at least one complete tag set loaded into the page buffer formed by the IO sense amplifier bank), and (ii) the cache lines corresponding to the different ways (different tag addresses) are or may be disposed within different rows of the data DRAM store. Alternative embodiments (or differently programmatically configured embodiments) in which the all cache lines corresponding to given tag set are stored within the same data DRAM row (which may logically span multiple DRAM dies in some implementations) or having single-way set-associativity (i.e., direct-mapped cache) are discussed below in reference to FIGS. 10 and 11.

Continuing with FIG. 9, the tag engine responds to incoming commands from the host processor by executing command-specific sequences of operations. In the case of read, write and fill commands at 280, 281, 282 (each accompanied by a "request address" having tag and index sub-fields, the former constituting the search tag), the tag engine executes a tag DRAM search (283, 284, 285) to determine whether a valid cache line corresponding to the request address is stored within the data DRAM(s). In one embodiment, shown in detail view 287, the tag engine commences the tag DRAM search by reading out a tag-set readout at 289—executing row activation and column decode operations within the tag storage array to transfer a tag set (275) from an index-specified set of tag DRAM storage cells to the IO sense amplifier bank. Thereafter, the tag engine enables a tag-compare operation within the compare block and selective modify operation within the RMW engine (collectively shown at 291) as discussed, for example, in reference to FIGS. 7 and 8. If the search tag matches a valid tag in the tag set (i.e., affirmative compare-block determination at 293), a tag hit is signaled on the hit/miss component of the global output lines (i.e., "global-out.hit:=1," effectively driving that signal to the processor interface via the hit/miss bus) and a way address ("way") corresponding to the matching tag is output to the data DRAM PHY along with the index sub-field of the address supplied by the processor (e.g., way bits constituting least significant bits of a data DRAM read/write address "index|way," where '|' denotes concatenation). These cache-hit outputs are shown for example at 295. If the search tag is determined not to match a valid tag in the tag set (negative determination at 293), the compare block signals a tag miss on the hit/miss component of the global output lines (global-out.hit=0, driving that miss indication to the processor via the hit/miss bus) and outputs a way address corresponding to either an invalid way (i.e., tag set for which state-field valid bit is clear) or the least recently used way, the latter being indicated by relative values of the recency bits for the four ways (see, for example, cache-miss outputs at 297). In the cache-miss scenario, the compare block additionally outputs the dirty bit corresponding to the way address (i.e., invalid or LRU way) and, where there are no invalid ways, the tag address corresponding to the LRU way (i.e., "way.tag"), the latter constituting a victim tag address (i.e., tag address of cache line to be evicted from the data DRAM(s) in response to the cache miss). Where the way address corresponds to an invalid way, the compare block may deassert the dirty signal (i.e., global-out.dirty:=0) and refrain from outputting a tag address (i.e., tag address becomes a don't care output 'xx' as in the case of a cache hit).

In alternative embodiments, the compare block (and/or tag engine controller) may drive different and/or additional outputs during cache hit/miss. As one example, a read miss in a multi-way set-associative CDRAM implementation for which there is an invalid way and also a dirty way, the tag engine may respond with a read miss dirty (and also issue instructions to the data DRAM(s) to read out the cache line from the dirty way) to effect write-back of the dirty cache line to (i) keep the contents of the CDRAM as clean as possible and (ii) avoid wasting the DQ bus transmission interval accorded to the cache access. In such an embodiment, qualifying signals may be output via the hit/miss bus (e.g., outputting all four valid/invalid signals as part of the hit/miss bus) to indicate that at least one way in the set is not valid so that any subsequent write (or fill) operation will not trigger an eviction but rather load into the invalid way.

When allocating an entry into the cache, the tag address and associated status bits are written to the tag DRAM core and a corresponding cache line is written to the data DRAM (s). These operations may be carried out concurrently (i.e., at least partly overlapping in time) or in two disjointed steps (e.g., update tag entry at read-miss time and then write corresponding CL to data DRAM(s) at a later time). If configured (programmatically or by design) for two-step fill, the data-valid bit (for any or all ways) may be output as part of the status bits driven onto the hit/miss bus so that if a read-hit occurs with respect to a tag entry for which the subsequent CL fill has not been completed, the host processor is informed that the entry that yielded the cache hit—the target fill entry—is not yet valid (impliedly indicating that a CL fill is under way or expected) and thus to await the response from the backing store before completing the cache read transaction. Moreover, in this specific case—read hit for which CL is not yet valid (read-hit, no-data)—the tag engine may also coordinate output of a dirty CL from a different way so as not to waste a transmission slot on the DQ bus. The tag engine may also output dirty on read hit (e.g., if the matching way is dirty) to inform the host processor of the dirty CL status and thus enable the processor to write (of the dirty CDRAM CL) to far/backing memory (keeping the CDRAM contents as clean as possible). Various actions may be implemented in that instance to maintain coherency including, for example and without limitation: tag engine responds to special "Clear" command to clear the dirty bit (after far write is completed/initiated by the host processor) for the dirty way; or the tag engine is configured (e.g., by programmed setting) to automatically clear the dirty bit as part of the original read (on expectation that processor will write to the dirty CL to far memory to restore coherency). In another embodiment, the cache control protocol may support a special read/clear-dirty command which the processor may selectively issue, and to which the tag engine would respond in the case of a read-hit-dirty, by clearing the dirty bit within the matching way and instructing the data DRAM to output the dirty CL (i.e., to be written to backing memory). Numerous other programmatically controlled responses to cache hit/miss results (including outputting validity or other status signals via the hit/miss bus) and/or support for additional specialized commands may be implemented in alternative embodiments.

Continuing with FIG. 9 and more specifically to read command execution, the tag engine responds to a cache hit (i.e., a "read cache hit") by triggering cache line readout within the data DRAM(s)—i.e., issuing command/address signals via the data DRAM PHY (see FIG. 3, element 133) instructing the data DRAMs to output a cache line from an address "index|way" as shown at 301—and updating LRU bits within the tag DRAM (303). Per the legend at 304 (i.e., shaded outline for data DRAM read/write; shaded box for tag DRAM read/write; dashed box around concurrent operations), the cache line readout operation is executed within the data DRAM concurrently with the LRU bit update within the tag DRAM, an operational parallelism that readies the tag DRAM for subsequent search even as cache line readout may be ongoing. Moreover, the LRU bit update—effected, for example, by recency-bit modification with the RMW engine according to the pseudocode shown at 306 (i.e., revising the recency value for the way identified in the cache hit to a most-recent value '00' (if not already the most recent) and incrementing the recency values for all other ways)—is implemented by overwriting contents of the tag DRAM page opened as part of the tag search operation (i.e., open page constituted by one or more tag sets transferred to the IO sense amplifier bank during tag DRAM row activation). That is, a single relatively low-latency row activation operation within the tag DRAM opens the page needed for hit/miss determination within the compare block (i.e., delivering the tag set to be compared with the incoming search tag) and subsequent tag-set update (revised contents of tag set generated by RMW engine and written back to the open page). Moreover, because RMW updates to the tag-set are dependent entirely on the host command and compare block outputs (at least in most cases), the tag engine may precharge the tag DRAM array (316) immediately after writing updated tag-set values (dirty bits, recency bits, validity bits, replacement tag) back to the open page, enabling commencement of subsequent tag DRAM search in some instances before the data DRAM access (cache line read or write) is completed.

Where the search operation at 285 operation yields a cache miss for which the dirty bit is asserted (i.e., "dirty-miss read" as shown by affirmative determination at 309 and in which the available way is the LRU way rather than an invalid/unoccupied way, and the dirty bit for the LRU way is set), the tag engine commands the data DRAMs to output the cache line at index|way to the processor at 311 (evicting a victim cache line), outputs the tag value within the LRU way ("way.tag") at 313 and updates the LRU way at 315 to make ready for an ensuing cache write operation or cache fill operation—all operations being executed concurrently, including both issuance of the read command to the data DRAM(s) and commencement of that read operation within the data DRAM(s). If the tag DRAM search yields a clean read miss (miss determination at 283, negative determination at 309), the tag engine precharges the tag DRAM at 316 without updating the tag-set content or issuing commands to the data DRAM (i.e., the clean miss indicates that there is either an invalid/unoccupied way or clean LRU way which may be filled within a replacement cache line, so that no eviction or tag-set update is required).

Continuing with FIG. 9, the tag engine responds to a write cache hit (hit determination at 284) by issuing a write command and address (index|way) to the data DRAM(s) (321) and concurrently updating the tag set (i.e., setting the dirty bit for the way being written and updating the LRU/recency bits as shown at 323 to reflect the access to the resident cache line) and then precharging the tag DRAM (316). As discussed, the tag set update (writing into open page within IO sense amplifiers) and precharge operations may both be executed within the tag DRAM as the cache line write operation is ongoing within the data DRAMs.

The tag engine responds to a write clean miss (i.e., miss determination at 284, negative determination at 325) in essentially the same manner as a write hit, but additionally modifies the indexed tag set (i.e., via RMW engine write into the open page containing the tag set) by overwriting the tag at the specified way with the search tag at 333—the specified way being either an invalid/unoccupied way, or a valid way indicated by the corresponding dirty bit to be clean and thus coherent with backing store content.

The tag engine and processor may respond to a write dirty miss (i.e., affirmative at 325 and signaled via the hit/miss bus as discussed above) in accordance with various programmable policy settings/configurations. Under one exemplary policy, for instance, the tag engine responds to a write dirty miss by executing operations similar to those shown for a read dirty miss—invalidating the LRU way or marking that way clean in a tag-set update (327) and evicting the cache line at index|way, except with the victim tag address and evicted cache line being transferred to a flush buffer as shown at 328, 329 rather than directly to the processor, thereby avoiding contention with the inbound cache line supplied with the write request (alternatively only the evicted cache line is stored within the flush buffer as the victim tag address is separately communicated to the host processor via the hit/miss bus as part of the dirty miss response). At that point, the tag engine may conclude the write command by writing the new tag and new CL into the tag DRAM and data DRAM, respectively. In an alternative embodiment, the tag engine may conclude the write dirty miss without completing the commanded write operation, expecting instead that the processor will respond to the write dirty miss by (i) issuing a fill instruction (282) with the same address supplied with the prior write-effectively a write-retry with deterministic way availability effected by the initial write command, and (ii) issuing a flush instruction (350) to write the flush-buffered cache line to the backing store at an address formed by the corresponding flush-buffered tag address concatenated with the processor supplied index. In one embodiment, the flush buffer is implemented as a queue (e.g., to enable multiple write dirty miss events—each triggering evicted-CL/evTag insertion into the queue—before issuing responsive flush commands) so that the tag engine responds to the flush command at 350 by popping an evicted cache line and associated tag address from the head of the flush buffer queue (e.g., advancing pointers within a ring buffer or other queue implementation within the cache-line buffer element shown at 131 in FIG. 3) and outputting those values to the processor (351). As mentioned above, the tag address associated with the evicted cache line may already have been communicated to the host processor via the hit/miss bus during the dirty-miss response and thus (in such an embodiment) need not be stored within the flush buffer queue.

The tag engine responds to an incoming fill instruction at 282 (i.e., bearing the same address that yielded a dirty miss in response to a preceding cache write instruction) by searching the DRAM (285) to identify the way previously invalidated/marked clean in response to the prior write dirty miss (i.e., expecting a cache miss and so signaling an error in response to a cache hit) by executing a cache line write (341) and tag-set update (343) similar to those for a write clean miss, except for clearing the dirty bit in the tag-set update. In alternative embodiments, the incoming fill instruction may specify the status of the dirty bit to be written into the tag set (i.e., as part of update operation 343) so that, for example, if the cache line supplied with the fill instruction is sourced from a higher-level cache in a dirty state, the fill instruction may specify the dirty state of the incoming cache line to be applied within the tag-set update at 343. In embodiments where the tag engine updates the tag entry at the time of a read miss, the tag engine may respond to an incoming fill instruction by storing the incoming cache line within the data DRAMs without executing a tag DRAM search—"a no-search fill." Where no-search fill is implemented within a multi-way set associative CDRAM, information indicating the CL way to be filled may be supplied with the fill instruction (i.e., host processor informed of a way address in response to the read miss and then re-submits that way address with the fill instruction) or otherwise made available in association with the fill instruction (e.g., tag engine responds to read miss by queueing the way address to be matched up with subsequent fill instruction submission).

FIGS. 10 and 11 illustrate exemplary tag-engine operations in CDRAM embodiments for which all shared-index cache lines may be simultaneously activated within the data DRAMs—that is, all cache lines within a multi-way set-associative CDRAM are co-located within the same index-specified row (which row may span multiple data DRAMs) or the CDRAM is direct mapped (i.e., single-way per index). FIG. 10 illustrates exemplary tag-engine operations in the former case (multiple ways per index, with the cache lines for all ways co-located within the same storage row), illustrating the early data-DRAM row activation for incoming read, write and fill commands. That is, because the cache lines for all ways are stored within the same index-specified row, that row may be activated (opening a page containing the cache lines for all possible ways) without awaiting the result of the tag DRAM search. Accordingly, for each command that requires data DRAM access (read, write, fill), the tag engine simultaneously commences tag DRAM search (e.g., executing operations shown at 287 in FIG. 9) and data DRAM row activation—the latter indicated at 371, 373 and 375 in FIG. 10 (i.e., triggering a row-address-strobe signal assertion, "ras," at the row address field constituted in whole or part by the processor-supplied index). The tag engine subsequently executes all search-dependent operations generally as discussed in reference to FIG. 9, except with data DRAM operation reduced to way-dependent column access operations. Thus, the CL readout operation, eviction operations, and write operations shown in FIG. 9 (i.e., operations at 301, 311/329, and 321/331/341) are all completed at an earlier point in time (i.e., due to the early row activation time) in the FIG. 10 execution sequence and limited to column access operations as indicated by the "cas"—column address strobe—designation within the CL read, evict and write operations 381, 383/384 and 385/386/387.

Tag engine operations in the direct-mapped-CDRAM diagram (FIG. 11), are identical to those shown in FIG. 10 (again, the tag engine commences row activation within the data DRAM immediately upon a receiving read/write/fill command so that the row activation transpires concurrently—at least partly overlapping in time—with the tag DRAM search), except that no LRU bit update is required (i.e., as there is only one way per set). Thus, the LRU-bit update at 389 in FIG. 10 (i.e., following a read hit) is omitted, and LRU-bit updates are likewise unneeded following write-hit, write-miss (dirty and clean) and fill operations.

Figure 12:
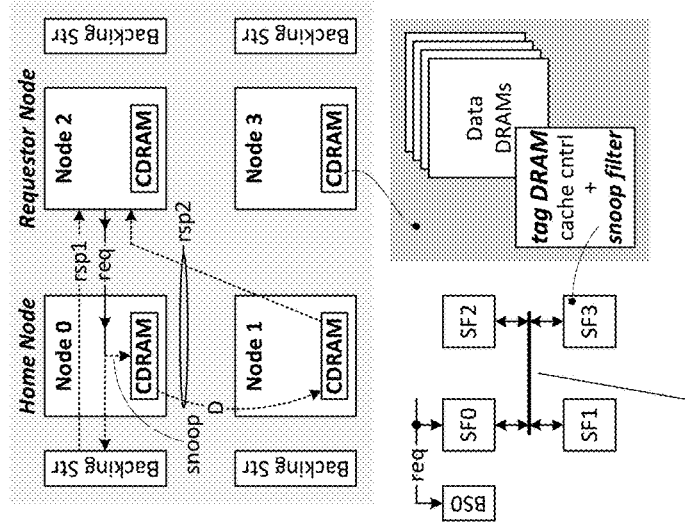
FIG. 12 illustrates an exemplary computing system populated by multiple processing nodes each coupled to a respective backing store and implemented, for example, by a respective processor and CDRAM as discussed in FIGS. 1-11, the CDRAM additionally performing a snoop-filter function.

FIG. 12 illustrates an exemplary computing system populated by multiple processing nodes (nodes 0, 1, 2 and 3), each coupled to a respective backing store ("local backing store") and implemented, for example, by a respective processor and CDRAM as discussed above (for instance, a socketed die stack as shown in FIG. 1). In the arrangement shown, each processing node constitutes a "home node" as to its local backing store and, upon request, may output cache lines from that backing store to the other nodes (the other nodes constituting "requestor" nodes for such transactions). To support this memory sharing architecture, a snoop filter ("SF") within each processing node snoops memory access requests directed to its local backing store to track where (i.e., in which processing nodes) cache lines from that backing store are cached. As the maximum entry count within the snoop filter is set by the total cache volume of the computing system (i.e., sum of per-node cache sizes), the expansive CDRAM installation within each processing node (e.g., CDRAM having a capacity 100× or greater than that of a conventional SRAM last-level cache) dramatically increases the requisite snoop filter size.

In the FIG. 12 embodiment, snoop-filter implementation challenges posed by the relatively massive CDRAM installations are overcome by architecting the CDRAM tag die to serve double duty as both the above-described cache tag engine (i.e., supporting cache hit/miss determination and responsive actions) and a snoop filter—an arrangement shown conceptually by the breakout view of the CDRAM within processing node 3. That is, the tag DRAM die within that CDRAM implements a snoop filter for processing node 3—"SF3" in the Node-3 is interconnected to the other processing nodes (Node-1, Node-2, Node-3 in this example) via node interconnect buses and/or control signal lines (depicted conceptually as a multi-drop bus in FIG. 12, though any practical node-interconnect topology may be used).

In a number of tag-engine/snoop filter embodiments, the state fields stored with respective cache line tags are expanded to include information indicating which processing node (or nodes) contain cache lines drawn from the home-node backing store together with state information indicating whether a given cache line is held exclusively by a given processing node (E), shared by multiple nodes (S), or modified relative to backing store contents (M). And the tag engine itself is expanded to support snoop filter operations, including snoop-filter check (SFC) operations (i.e., snooping read, read-own and store requests from requestor nodes) and various responsive hit/miss operations including, for example and without limitation, issuance of "downgrade" probes to (i) fetch a cache line from a directed node (D), fetch a CL from and invalidate that CL within a directed node (DI), and (iii) broadcast an invalidation directive to all nodes to invalidate their respective copies of a specified cache line (BI), and so forth. In an exemplary transaction shown in FIG. 12, for instance, a request "req" from processing node 2 ("requestor node") to read a cache line from the backing store of processing node 0 ("home node") is snooped within the home-node CDRAM (i.e., by the snoop filter implementation within the home-node CDRAM). If a snoop filter miss occurs (i.e., indicating that the requested cache line is not cached anywhere within the processing system), the home node responds as indicated at "rsp1" by fulfilling the request from the backing store and updating its snoop filter to indicate that the cache line is stored within the CDRAM of the requestor node (processing node 2). By contrast, if the snoop filter check (SFC) indicates that the requested CL is cached exclusively within, say, processing node 1 (i.e., snoop filter hit, with state=E or M), the processing node issues a downgrade probe to node 1, directing that node to deliver the cache line to the requestor node (i.e., fetching the CL from node 2 to node 1)—collectively response 2 (rsp2)—and updates the snoop filter entry to denote the shared status of the cache line (i.e., changing the SF entry from state E or M to state S).

Returning to the SF miss example, if the snoop filter way corresponding to the requested cache line is full, an eviction is needed (similar to eviction within the cache itself) to provide space for storage of the new snoop filter entry (i.e., entry indicating that processor node 2 contains a copy of the subject cache line). As the evicted entry indicates cache line storage within one or more requestor nodes, downgrade probes are issued to those nodes to invalidate their copies of the subject cache line. FIG. 13 illustrates an exemplary sequence of operations executed within the CDRAM tag-engine/snoop filter of a given processing node (and nodes receiving downgrade probes therefrom) as necessary to implement eviction with respect to snooped cache line read request 430 (eviction actions with respect to read-own and store requests (432, 434) are identical and thus not separately shown). In the case of a snoop-filter hit for any entry with non-shared state (affirmative determinations at 441 and 443), the snoop filter sends a downgrade probe (D) to the directed node (i.e., node having a cached copy of the requested cache line) at 445, and the directed node responds at 447 by returning the data to both the home node and the requestor. Thereafter, the snoop filter updates the SF entry state to "shared" (S) for the subject cache line (449) as copies of the CL are contained within the CDRAMs of multiple processing nodes. The home node responds to a read-hit on a snoop filter entry having a shared state (affirmative at 441, negative at 443) by returning the cache line to the requestor node and concluding the access (449).

As discussed, when a snoop filter miss occurs (negative determination at 441), the home node returns the requested CL to the requestor (461), then updates the snoop filter to reflect the shared cache line. In the FIG. 13 example, the snoop filter update is executed at 463 (i.e., injecting an entry for the requested CL and setting the state to 'shared' in the depicted read access example—setting the state to 'E' (exclusive) in a similar eviction-handling flow for ReadOwn (432), and to 'M' (modified) in the case of a Store (434)) if an entry is available (negative determination at 465), and at 467—after evicting an existing entry at 469 based on LRU/LFU/ . . . etc.—if the snoop filter is full (state set to 'E' or 'M' in operations corresponding to that at 467 within eviction-handling flows for ReadOwn and Store, respectively). If the evicted cache line is modified (M) or exclusive (E)—affirmative determination at 471—the snoop filter transmits a downgrade/invalidate (DI) probe to the directed node at 473, and the directed node responds at 475 by returning the subject cache line to the home node and invalidating its instance of the cache line. If the evicted cache line has a state other than modify/exclusive (i.e., state=shared, yielding negative determination at 471), the snoop filter broadcasts an invalidate directive (BI) to all nodes at 477 to invalidate all extant copies of the subject cache line.

Figure 14:
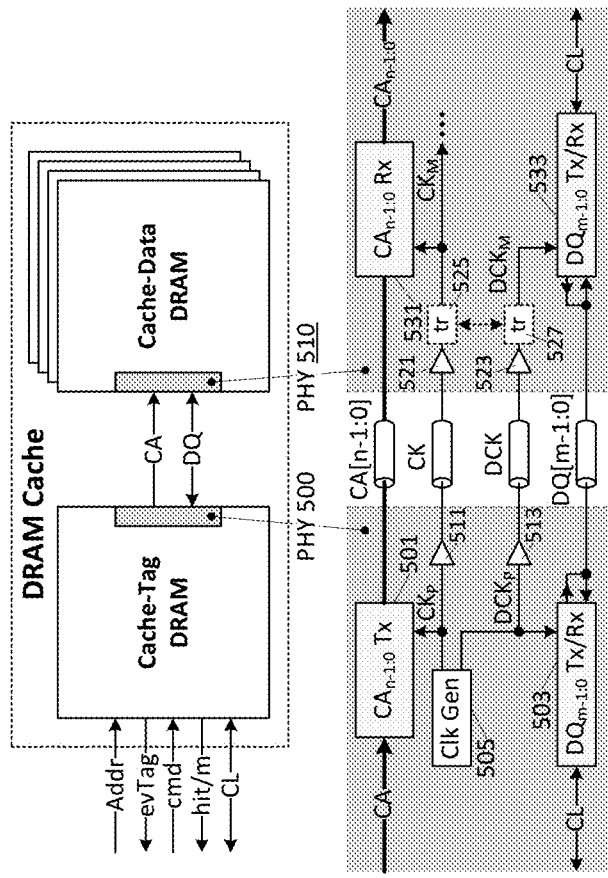
FIG. 14 illustrates more detailed embodiments of physical signaling interfaces that may be implemented within the tag DRAM and data DRAM dies of the various CDRAM embodiments discussed in reference to FIGS. 1-13.

FIG. 14 illustrates more detailed embodiments of physical signaling interfaces (PHYs) that may be implemented within the tag DRAM and data DRAM dies of the various CDRAM embodiments discussed above to enable the tag DRAM die to issue command/address values (CA) to the data DRAM(s) as necessary to read and write corresponding cache lines (DQ). In the depicted example, the tag DRAM PHY 500 includes a bank of command/address transmitters 501, data transceiver bank 503 and clock generator 505, the latter generating controller-side command/address and data clocks ($CK_P$, $DCK_P$) that are forwarded to data DRAM PHY 510 (i.e., over timing signal links "CK" and "DCK" via clock drivers 511, 513) and applied internally to command/address transmitters 501 and data transceivers 503, respectively. The forwarded command/address and data clocks are received within data DRAM PHY 510 via buffer/amplifiers 521 and 523, respectively, and propagate through optional clock trees 525, 527 (each tree generating multiple instances of the input clock, phase offset from the input clock and phase aligned with one another) to yield memory-side command/address and data clocks (CKM, DCKM, respectively) that are supplied to command/address receivers 531 and data transceivers 533. Optional alignment circuitry may be provided to phase-align the memory-side clocks so that the data DRAM PHY (and circuitry downstream therefrom) operates in a unified clock domain, avoiding domain crossing circuitry, for example, between the data DRAM storage core (not specifically shown and data transceivers 533.

The tag DRAM PHY issues cache-line read and write commands (e.g., in response to corresponding commands from the tag engine as discussed above) accompanied by cache line addresses via CA transmitters 501 and receives/transmits corresponding cache lines via data transceivers 503. The data DRAM PHY operates in counterpart fashion, forwarding command/address values (sampled/recovered by CA receivers 531) to a command decoder (not specifically shown) which, in turn, issues control signals as necessary to implement commanded operations, including enabling cache line reception and transmission within data transceivers 533. In one embodiment, the tag DRAM PHY 500 includes a respective set of command/address transmitters and data transceivers per data DRAM so that all command/address and data signaling links are coupled point-to-point between the tag DRAM die and a given data DRAM die (e.g., via TSVs as discussed above), effectively implementing a dedicated memory channel per data DRAM die. In alternative embodiments, the command/address links and/or data links may be coupled in multi-drop fashion (or point-to-multipoint) between the tag DRAM PHY and two or more (or all) data DRAM dies. As a specific example, command/address transmitters 501 may be coupled in parallel (multi-drop) to respective sets of command/address receivers 531 within multiple data DRAM dies (or any subset thereof), while a respective subset of the data transceivers 503 is coupled point-to-point with a counterpart set of transceivers within each DRAM die (e.g., in an embodiment having four data DRAMs each having 'm/4' data transceivers, the data transceivers within each data DRAM may be coupled point-to-point with a corresponding m/4 subset of the m transceivers within the tag DRAM PHY). By this operation, all data DRAMs (or a subset thereof coupled to a common chip-select line or having IDs programmed to form a memory rank) may respond collectively to a given memory access command, for example, each outputting or sampling a respective slice of a cache line simultaneously. Various alternative signaling interfaces and die-interconnect topologies may be implemented in alternative embodiments, including strobed signaling interfaces (i.e., source-synchronous strobe transmitted by counterpart PHYs 500 and 510 together with outbound data), signaling interfaces in which a single clock is forwarded by the tag DRAM PHY (instead of separate command/address and data clocks), and so forth.

The various integrated circuit components and constituent circuits disclosed herein in connection with heterogenous-die DRAM cache embodiments may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, layout, and architectural expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits and device architectures can be processed by a processing entity (e.g., one or more processors) within the computer system in conjunction with execution of one or more other computer programs including, without limitation, net-list generation programs, place and route programs and the like, to generate a representation or image of a physical manifestation of such circuits and architectures. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply details not required to practice those embodiments. For example, any of the specific numbers of integrated circuit components, interconnect topologies, physical signaling interface implementations, numbers of signaling links, bit-depths/sizes of addresses, cache lines or other data, cache request/response protocols, snoop-filter request/response protocols, etc. may be implemented in alternative embodiments differently from those described above. Signal paths depicted or described as individual signal lines may instead be implemented by multi-conductor signal buses and vice-versa and may include multiple conductors per conveyed signal (e.g., differential or pseudo-differential signaling). The term "coupled" is used herein to express a direct connection as well as a connection through one or more intervening functional components or structures. Programming of operational parameters (e.g., cache replacement policies, optional cache and/or snoop filter operations, and so forth) or any other configurable parameters may be achieved, for example and without limitation, by loading a control value into a register or other storage circuit within above-described integrated circuit devices in response to a host instruction and/or on-board processor or controller (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A cache memory comprising:
   a first dynamic random access memory (DRAM) die having a first DRAM array to store address tags and circuitry to generate a cache hit/miss result in response to a cache access request by comparing a search tag supplied with the cache access request with the address tags stored within the first DRAM array;
   a second DRAM die coupled in a stacked-die configuration with the first DRAM die and having a second DRAM array to store cache lines corresponding to the address tags;
   an interface to receive the cache access request from a processor die that is coupled in a stacked-die configuration with the first DRAM die and the second DRAM die, the interface including a dedicated hit/miss bus: and
   circuitry to output one or more signals representative of the hit/miss result from the first DRAM die to the processor die via the dedicated hit/miss bus.

2. The cache memory of claim 1 further comprising at least one additional DRAM die coupled in a stacked-die configuration with the first and second DRAM dies and having a DRAM array to store cache lines corresponding to the address tags.

3. The cache memory of claim 1 wherein the first DRAM die comprises an interface to issue one or more memory access commands to the second DRAM die in accordance with the hit/miss result.

4. The cache memory of claim 3 wherein the interface to issue one or more memory access commands to the second DRAM die comprises circuitry to issue one or more memory access commands that instruct the second DRAM die to output, from among the cache lines stored therein, a cache line indicated by the hit/miss result to be sought by the cache access request.

5. The cache memory of claim 1 wherein the circuitry to generate a cache hit/miss result in response to a cache access request by comparing a search tag supplied with the cache access request with the address tags stored within the first DRAM array comprises circuitry to execute a row activation within the first DRAM array to transfer one or more of the address tags stored within the first DRAM array to a page buffer of the first DRAM array.

6. The cache memory of claim 5 wherein the circuitry to execute the row activation to transfer one or more of the address tags to the page buffer comprises circuitry to transfer, to the page buffer, state information corresponding to the one or more of the address tags, the state information including information indicating whether one or more of the cache lines, stored within the second DRAM array and corresponding to the one or more of the address tags, has been modified relative to counterpart instance of the one or more cache lines within a memory external to the first and second DRAM dies.

7. The cache memory of claim 5 wherein the circuitry to execute the row activation to transfer one or more of the address tags to the page buffer comprises circuitry to transfer state information corresponding to the one or more of the address tags to the page buffer, the first DRAM further comprising a DRAM control interface to issue a memory access command to the second DRAM to access a cache line indicated by the search result and, during an interval in which the second DRAM executes the memory access command, update the state information within the page buffer.

8. The cache memory of claim 1 wherein the first DRAM die comprises:
a snoop filter to receive a request, from an integrated circuit component external to the processor die and first and second DRAM dies, to obtain a cache line from a backing-store memory associated with the processor die, and compare address information associated with the request to obtain the cache line with stored address information within the first DRAM array to determine whether the cache line has been stored in a location other than the cache memory and the backing-store memory.

9. The cache memory of claim 1 wherein the first DRAM die has a shorter memory access latency than the second DRAM die.

10. A method of operation within a cache memory, the method comprising:
generating, within a first DRAM die in response to a cache access request, a cache hit/miss result by comparing a search tag supplied with the cache access request with address tags stored within a first DRAM array of the first DRAM die;
storing, within a second DRAM array of a second DRAM die that is coupled in a stacked-die configuration with the first DRAM die, cache lines corresponding to the address tags;
receiving the cache access request from a processor die that is coupled in a stacked-die configuration with the first DRAM die and the second DRAM die; and
outputting one or more signals representative of the hit/miss result from the first DRAM die to the processor die via a dedicated hit/miss bus.

11. The method of claim 10 further comprising storing cache lines corresponding to the address tags within at least one additional DRAM die such that cache lines corresponding to the address tags within the first DRAM die are stored within multiple other DRAM dies.

12. The method of claim 10 further comprising issuing one or more memory access commands from the first DRAM die to the second DRAM die in accordance with the hit/miss result.

13. The method of claim 12 wherein the one or more memory access commands instruct the second DRAM die to output, from among the cache lines stored therein, a cache line indicated by the hit/miss result to be sought by the cache access request.

14. The method of claim 10 wherein comparing the search tag with the address tags stored within the first DRAM array comprises executing a row activation within the first DRAM array to transfer one or more of the address tags stored within the first DRAM array to a page buffer of the first DRAM array.

15. The method of claim 14 wherein executing the row activation to transfer one or more of the address tags to the page buffer comprises transferring, to the page buffer, state information corresponding to the one or more of the address tags, the state information including information indicating whether one or more of the cache lines, stored within the second DRAM array and corresponding to the one or more of the address tags, has been modified relative to counterpart instance of the one or more cache lines within a memory external to the first and second DRAM dies.

16. The method of claim 14 wherein executing the row activation to transfer one or more of the address tags to the page buffer comprises transferring state information corresponding to the one or more of the address tags to the page buffer, the method further comprising issuing a memory access command to the second DRAM to access a cache line indicated by the search result and, during an interval in which the second DRAM executes the memory access command, updating the state information within the page buffer.

17. The method of claim 10 further comprising:
detecting a request, from an integrated circuit component external to the processor die and first and second DRAM dies, to obtain a cache line from a backing-store memory associated with the processor die, and comparing address information associated with the request to obtain the cache line with stored address information within the first DRAM array to determine whether the cache line has been stored in a location other than the cache memory and the backing-store memory.

* * * * *